INVENTOR
WILLIAM C. KAUFMAN
BY
Seidel & Gonda
ATTORNEYS.

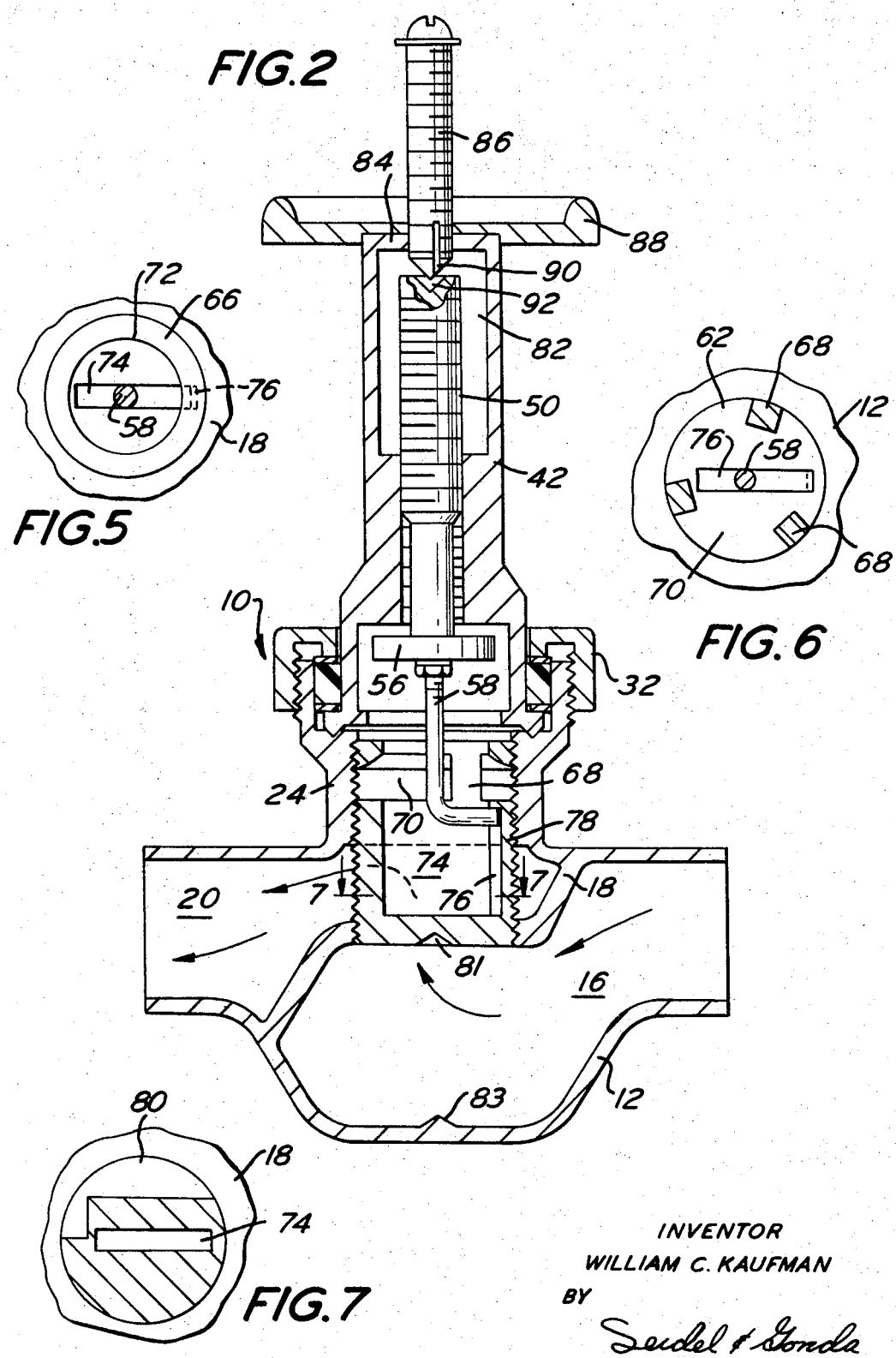

United States Patent Office 3,572,369
Patented Mar. 23, 1971

3,572,369
REMOVABLE SEAT ENGAGING ELEMENT
William C. Kaufman, 35 Moredon Road,
Philadelphia, Pa. 19115
Filed Feb. 7, 1969, Ser. No. 797,474
Int. Cl. F16k 1/44, 43/00
U.S. Cl. 137—315                                     10 Claims

ABSTRACT OF THE DISCLOSURE

A valve is disclosed which permits a sealing element on a flow control member, such as a washer, to be removed for repair or replacement while allowing flow between the inlet and outlet chambers of the valve, thereby preventing the necessity of shutting off flow during such replacement.

---

This invention relates to a valve, and more particularly to a valve structurally interrelated in a novel manner whereby the flow between the inlet and outlet chambers of the valve body need not be shut off during repair or replacement of sealing elements, such as a rubber washer. The valve of the present invention is particularly useful in those processes wherein the process must continue and hence flow cannot be shut off for the period of time necessary to repair or replace a sealing element.

It is a matter of common knowledge that many processes cannot be interrupted while a leaky valve is repaired. Heretofore, the valves which provided for repair or replacement of a sealing element included means for shutting off flow while the sealing element was repaired. The valve of the present invention obviates the necessity for shutting off such flow while at the same time is structurally interrelated in a manner so as to have all the attributes of a normal valve with a minimum number of extra components and being of the same or substantially the same size. Hence, the cost of the valve of the present invention may be competitive with the valves utilized heretofore.

The valve of the present invention includes a valve body which may assume a variety of shapes. The valve body includes an inlet and outlet chamber adapted to be placed in communication with one another by selectively operating a flow control means. The flow control means may be disposed in either the inlet or outlet chamber and preferably includes two sealing elements. One sealing element is adapted to have relative movement with respect to the other to effect the action of controlling flow.

Thus, in the valve of the present invention a sealing element in the form of a washer supported by a stem is moved toward and away from a seat. In addition, the seat is mounted for movement in an axial direction with respect to the stem when it is desired to cause the stem and washer to move upwardly into a bonnet on the valve body. The outlet chamber is isolated from the bonnet by means of the seat so that the washer may be removed while the inlet and outlet chambers are in communication with one another. In this instance, flow between the chambers can be at a uniform rate, at a predetermined rate, or may be selectively controlled by the configuration and size of a passage in the seat.

It is an object of the present invention to provide a novel valve structurally interrelated in a manner whereby a sealing element such as a washer may be removed for repair or replacement while allowing flow to continue from an inlet chamber to an outlet chamber.

It is another object of the present invention to provide a novel flow control valve which provides for selective control of flow while a sealing element such as a washer is being replaced.

It is another object of the present invention to provide a valve which permits a sealing element to be replaced while flow continues between the inlet and outlet chambers of the valve, while at the same time being of substantially the same size and cost of prior valves and at the same time having the attributes of simplicity and reliability.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a view similar to FIG. 1, but showing the components in the position wherein the sealing element may be removed while flow is being controlled.

FIG. 5 is a sectional view taken along the line 5—5 in FIG. 1.

FIG. 6 is a sectional view taken along the line 6—6 in FIG. 1.

FIG. 7 is a sectional view taken along the line 7—7 in FIG. 2.

Figure 1:
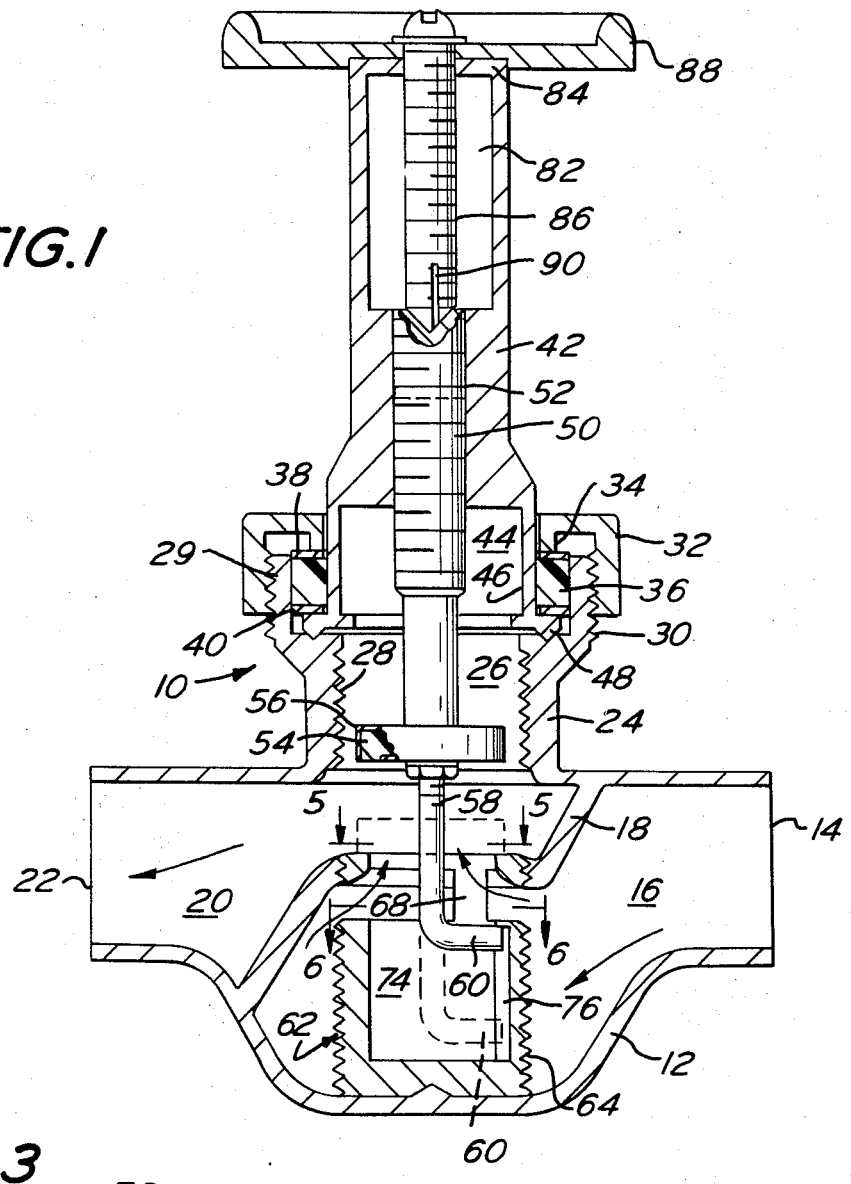
FIG. 1 is a vertical section view of the valve of the present invention, with the valve being in the open position.

Referring to the drawing in detail, wherein like numerals indicate like elements, there is shown in FIG. 1 a valve in accordance with the present invention designated generally as 10. The valve 10 includes a valve body 12 which may assume a wide variety of shapes. The valve body 12 is provided with an inlet port 14 communicating with an inlet chamber 16. The inlet chamber 16 is separated from the outlet chamber 20 by means of a web 18 and a valve seat to be described in greater detail hereinafter. The outlet chamber 20 is provided with an outlet port 22.

The valve body 12 includes a bonnet 24 having a bonnet chamber 26. The inner periphery of bonnet 24 is provided with threads 28. In FIG. 1, the chambers 20 and 26 are in direct communication. Bonnet 24 is provided with an axially extending cylindrical extension 29.

The bonnet extension 29 is provided with threads 30 on its outer periphery. A ring 32 is provided with threads on its inner periphery mating with threads 30. Ring 32 is provided with a radially inwardly directed flange terminating in a flange 34 which is axially directed. A packing gland 36 of any desired material is disposed below the flange 34 and within the extension 29. A metal washer 38 is disposed between packing gland 36 and flange 34. A similar metal washer 40 is disposed immediately below the packing gland 36.

A stem housing 42 is provided. At its lower end, stem housing 42 is provided with an axially disposed chamber 44 defined by the cylindrical wall 46. Chamber 44 is in direct communication with chamber 26. The terminal end of wall 46 is provided with a radially outwardly directed flange having a bead or bearing 48 which engages an end face on the bonnet 24. It will be noted that the flange at the terminal end of wall 46 is disposed radially inwardly from the bonnet extension 29 and supports the washer 40.

A stem 50 having lefthand threads on its outer periphery is disposed within an axial threaded bore 52 in the stem housing 42. All threads in the valve 10 are righthand threads except for the threaded engagement between stem 50 and bore 52.

The stem 50 is provided with a sealing element such as a rubber or plastic washer 54 disposed within a retainer 56. A stem extension 58 is threadedly coupled to the stem 50. A nut on the extension 58 overlies a washer which retains the washer 54 within the retainer 56.

Figure 3:
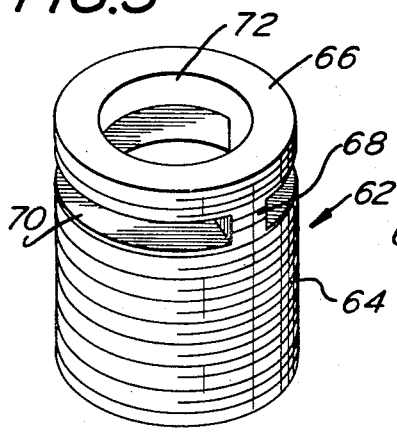
FIG. 3 is a perspective view of the valve seat.

The stem extension 58 is provided with a radially outwardly directed tongue 60 which at all times is disposed within the valve seat designated generally as 62. As shown more clearly in FIGS. 3 and 4, the valve seat 62 is provided with threads 64 on its outer periphery. The threads 64 cooperate with the threaded opening in web 18.

The seat 62 includes an end sealing face 66 adapted to cooperate with the washer 54 to shut off or control flow from the inlet chamber 16 to the outlet chamber 20. The seat 68 is provided with one or more radial flow passages 70 which communicate with an axially disposed flow passage 72 which emerges through the end face 66. Thus, it will be noted that the seat 62 comprises an upper and lower portion interconnected by webs 68. The upper and lower sections are spaced from one another so as to define the radial flow passages 70 while being integral and one piece due to the webs 68. The valve 10 preferably has three such webs as shown more clearly in FIG. 6.

As shown more clearly in FIGS. 1 and 5, the seat 62 is provided with a cavity 74 below the elevation of the passages 70. Cavity 74 is rectangular and is provided with a slot 76 at one end. The height of slot 76 is less than the height of the cavity 74 as will be apparent in FIGS. 1 and 2.

Figure 4:
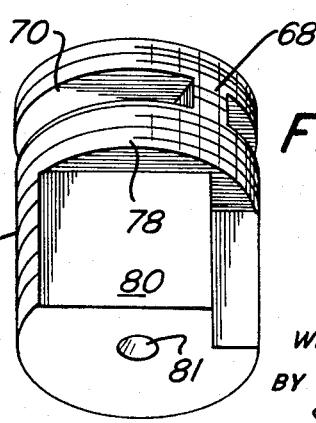
FIG. 4 is a another perspective view of the valve seat shown in FIG. 3.

As shown more clearly in FIGS. 4 and 7, the valve seat 62 is provided with a flow control passage 80. The shape of passage 80 may be varied as desired. As illustrated, passage 80 is in the form of a peripheral notch. That portion of the midsection of valve seat 62 between passage 80 and passage 70 is designated by the numeral 78. The significance of midsection 78 will be described in detail hereinafter. Centering of the seat 62 in its lowermost position as shown in FIG. 1 may be attained by a conical recess 81 on the bottom face of seat 62 and a conical bearing surface 83 on the bottom of the housing 12 within the inlet chamber 16. See FIGS. 2 and 4.

The upper end of the stem housing 42 is provided with a chamber 82 defined at its upper end by end wall 84 having a threaded opening axially disposed therein. A limit stop 86 is disposed within chamber 82. The limit stop 86 is preferably a threaded pin having threads meshing with the threaded opening in end wall 84. A handle 88 is attached to the end wall 84 and provided with an opening through which the pin 86 may extend. The pin 86 is provided with a tapered end adapted to enter a conical recess 92 in the end of stem 50. The lower end of the pin 86 is provided with an observation slot 90.

The valve 10 is used as follows:

The valve 10 may be utilized in any one of a wide variety of flow control systems. Flow occurs between the inlet chamber 16 and outlet chamber 20 as indicated by the arrows in FIG. 1. Control of the flow is effected by rotating the handle 88 which causes rotation of stem housing 42. Due to the lefthand thread connection between stem 50 and housing 42, and the inability of stem 50 to rotate as effected by the cooperation between tongue 60 and slot 76, the stem 50 reciprocates in a vertical direction so that the washer 54 may move toward and away from the end face 66 on the valve seat 62. It is to be noted that the valve seat 62 is disposed in its lowermost position in FIG. 1 and cannot move downwardly.

In FIG. 1, the washer 54 is in its fully open position. The fully closed position of washer 54 and retainer 56 is shown in phantom. The consequent phantom position of tongue 60 is also illustrated in FIG. 1. The fully open position of the washer 54 is attained when the recess 92 at the upper end of stem 50 engages the lowermost end of limit stop 86 as shown in FIG. 1.

When it is desired to remove the washer 54 for repair or replacement, the limit stop 86 is moved to the position shown in FIG. 2. Such movement is effected by rotating the pin 86 with a screwdriver until the observation slot 90 is barely visible. Thereafter, the stem housing 42 is rotated by means of handle 88 until the pointed end of pin 86 is again received within the recess 92 on stem 50. During the last-mentioned movement, the tongue 60 has reached the upper limit of slot 76 and therefore causes the seat 62 to unthread with respect to the web 18. As the seat 62 continues to rotate and move upwardly, the threads 64 thereon will become meshed with the threads 28. When the recess 92 engages the lower end of pin 86, the midsection 78 will be threaded to the bonnet 24.

At this point, the chambers 26 and 44 are in communication with one another, contain the washer 54, but are isolated from the outlet chamber 20. Flow between inlet chamber 16 and outlet chamber 20 continues by way of the passage 80 in the seat 62. At this point, the ring 32 and packing gland 36 may be removed so as to facilitate access to the washer 54. Due to the elongated nature of the cavity 74, and at radial clearance between bonnet extension 29 and the flange at the terminal end of wall 46, the entire stem housing 42 may be moved sideways until tongue 60 is no longer disposed within the slot 76 to thereby facilitate separation between the stem extension 58 and the seat 62. Subsequent to such separation, the housing 42, while supporting the stem 50, may be moved to any desired location for replacement or repair of the sealing element such as washer 54. At this point, it is possible to substitute an entire new stem 50 with an entirely new washer 54 and stem extension to thereby speed up the replacement or repair operations.

Assembly of the components of the valve 10 is accomplished in the reverse order as set forth above. Hence, a detailed explanation of the same is not deemed necessary.

The present invention may be embodied in other specific forms without departing from the spirit or essential attributes thereof.

I claim:

1. A valve comprising a valve body having an inlet chamber and an outlet chamber, said body being provided with a web separating said chambers, a valve seat threaded to an opening in said web, means for selectively controlling flow from the inlet chamber to the outlet chamber and including a movable sealing element in said body, said valve seat being adapted to cooperate with said sealing element and forming a part of said means for selectively controlling flow between the chambers, said body having an opening through which said element may be removed, means connected to the body for removing the sealing element from within said body while allowing flow from said inlet chamber to said outlet chamber during the time at which the sealing element is removed from said body and means in said body responsive to removal of the element for sealing said opening in the body.

2. A valve in accordance with claim 1 wherein said removing means includes a bonnet on the valve body and containing said opening, a stem housing axially disposed with respect to and sealed to the bonnet, said stem housing having a central bore on which are provided lefthand threads, a stem having lefthand threads, said stem being disposed within said bore with the threads being meshed, and a means for rotating the stem and stem housing with respect to said bonnet.

3. A valve in accordance with claim 1 wherein said removing means includes a bonnet on said valve body, said bonnet having threads on its inner peripheral surface, a stem housing including a stem adjustably supported thereby, said stem housing being sealingly coupled to said bonnet and forming an axial extension of the bonnet, and means on the housing for causing the stem to move through the bonnet.

4. A valve in accordance with claim 1 wherein said means for selectively controlling flow from the inlet chamber to the outlet chamber includes a valve seat for cooperation with said sealing element, said valve seat being supported by said body for movement in the same direction as said sealing element, and said valve seat having two independent flow passages each adapted to independently and alternatively place the inlet chamber in communication with the outlet chamber.

5. A valve comprising a valve body having an inlet chamber and an outlet chamber, said valve body having a bonnet, means for selectively controlling flow from the inlet chamber to the outlet chamber, said means including a sealing element removable through the bonnet, and means in said body isolating the chamber in the interior of the bonnet from the outlet chamber so that the sealing element may be repaired or replaced while allowing flow between said inlet chamber and outlet chamber, said last-mentioned means including a valve seat movable at least partially into sealing engagement with the bonnet in response to a predetermined movement of said sealing element.

6. A valve in accordance with claim 5 wherein said means for selectively controlling flow from the inlet chamber to the outlet chamber includes a valve stem and a valve seat, said stem and seat having a lost motion connection during a predetermined portion of the movement of the stem, said stem being supported by a stem housing.

7. A valve in accordance with claim 6 wherein said last-mentioned means includes means for rotating the stem housing and its stem relative to the bonnet without isolating the bonnet chamber from the outlet chamber with subsequent rotative movement of the stem housing relative to the bonnet causing such bonnet chamber and outlet chamber to be isolated from one another.

8. A valve comprising a valve body having an inlet chamber and an outlet chamber, said valve body including a web isolating said chambers from one another, said web having an opening, a valve seat supported by said web within said web opening, said valve body having a bonnet, a hollow stem housing sealingly connected to said bonnet and forming an extension thereof, a stem supported by said stem housing, said stem having a sealing element adapted to cooperate with a sealing surface on said seat for selectively shutting off flow between said inlet and outlet chambers, means for moving said stem relative to said seat and after a predetermined movement causing the stem and seat to move as a unit, means on the outer surface of the seat and the inner surface of the bonnet to effect a seal therebetween, means for separating the stem from the seat, and means for separating the stem housing from the bonnet to facilitate removal of the sealing element for repair or replacement while the bonnet is sealingly coupled to the seat and while flow continues between the inlet chamber and outlet chamber.

9. A valve in accordance with claim 8 including an adjustable limit stop supported by the stem housing for contact with the stem, said stem and housing being connected by lefthand threads, said seal between the seat and bonnet being effected by righthand threads on the outer surface of the seat and the inner surface of the bonnet, said seat being threadedly coupled to said web opening by righthand threads, and a handle connected to said stem housing for rotating the stem housing relative to the bonnet.

10. A valve comprising a valve body having an inlet chamber and an outlet chamber, said valve body having a bonnet, means for selectively controlling flow from the inlet chamber to the outlet chamber, said means including a sealing element removable through the bonnet and a valve seat in the body, and means for moving said valve seat from a first position wherein it cooperates with the sealing element to control flow to a second position wherein it isolates the interior of the bonnet from the outlet chamber so that the sealing element may be repaired or replaced while allowing flow between said inlet chamber and outlet chamber.

References Cited
UNITED STATES PATENTS

| 1,787,947 | 1/1931 | Lehnert | 137—329.2 |
| 1,833,700 | 11/1931 | Wolf | 137—317X |
| 2,559,268 | 7/1951 | Wyckoff | 137—614.13 |
| 2,870,629 | 1/1959 | Willis | 137—318X |

WILLIAM F. O'DEA, Primary Examiner

D. R. MATTHEWS, Assistant Examiner

U.S. Cl. X.R.

251—214, 220, 274, 330, 357; 137—614.13